United States Patent [19]
Wilkerson

[11] 3,924,296
[45] Dec. 9, 1975

[54] METHOD OF PREPARING MOLDED MEAT PRODUCTS

[75] Inventor: James E. Wilkerson, Adairville, Ky.

[73] Assignee: Odom Sausage Co. Inc. of Kentucky, Adairville, Ky.

[22] Filed: Dec. 9, 1974

[21] Appl. No.: 530,839

[52] U.S. Cl. .................................................. 17/45
[51] Int. Cl.² ........................................... A22B 3/00
[58] Field of Search ............ 17/45, 1 R, 32, 24, 25, 17/45, 46

[56] References Cited
UNITED STATES PATENTS.
| | | | |
|---|---|---|---|
| 3,116,515 | 1/1964 | Wilcox | 17/46 |
| 3,479,688 | 11/1969 | Hoersch | 17/45 |

*Primary Examiner*—G. E. McNeill
*Attorney, Agent, or Firm*—Harrington A. Lackey

[57] ABSTRACT

A process of preparing molded meat products which includes the steps of hot boning a freshly slaughtered animal carcass to obtain warm, fluent meat portions, grinding the meat portions, optionally blending the meat portions, and conveying the warm, fluent, ground meat portions to a filler device for dispensing controlled portions into uniform rigid receptacles. The filled receptacles are then conveyed through a temperature-changing apparatus, such as a cooking apparatus or a chilling apparatus, to congeal the meat products into the shapes of the rigid receptacles. The process is carried out within a minimum of time so that the temperature of the warm, fluent meat portions dispensed into the receptacles does not drop from the original animal temperature below 75°F.

If the shaped meat products in the receptacles are cooked, then the process preferably includes the additional step of removing the molded meat products from the receptacles and transferring them to a chilling station for freezing for subsequent storage or transporting.

10 Claims, 3 Drawing Figures

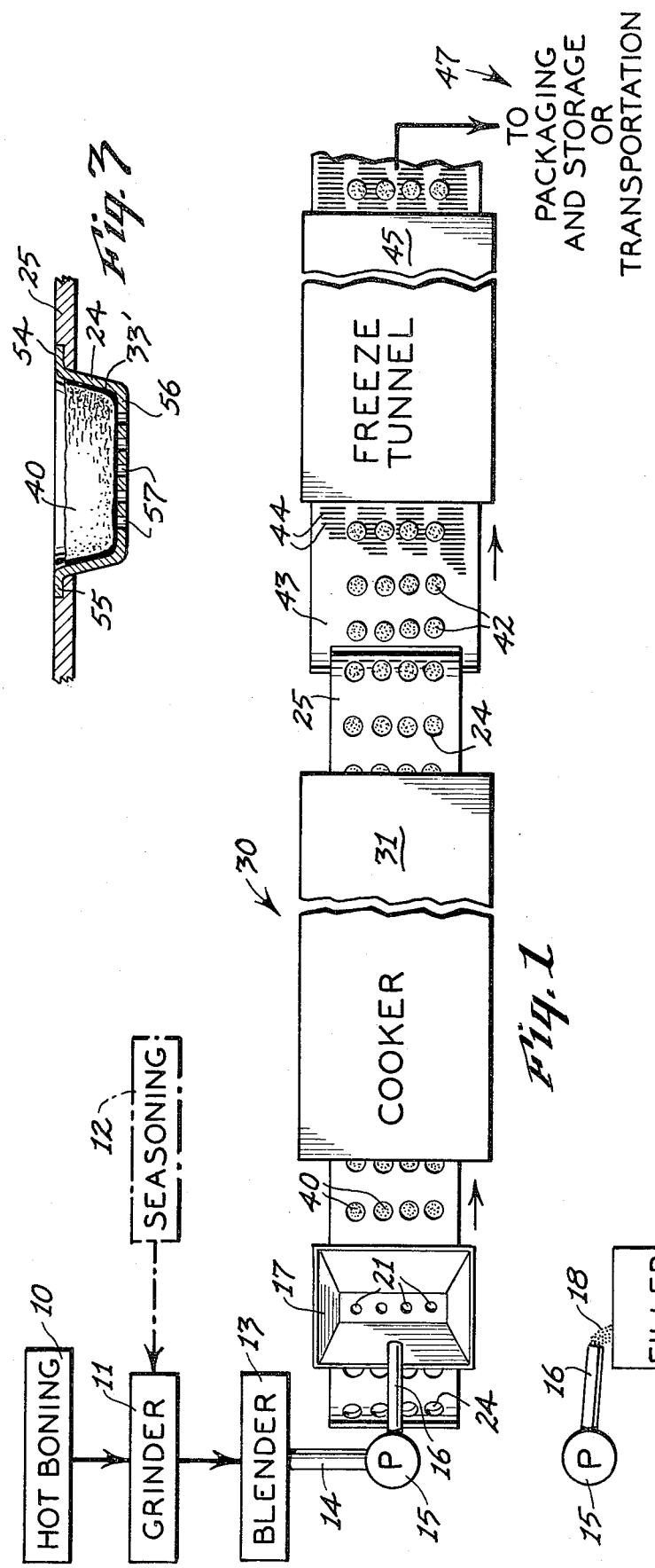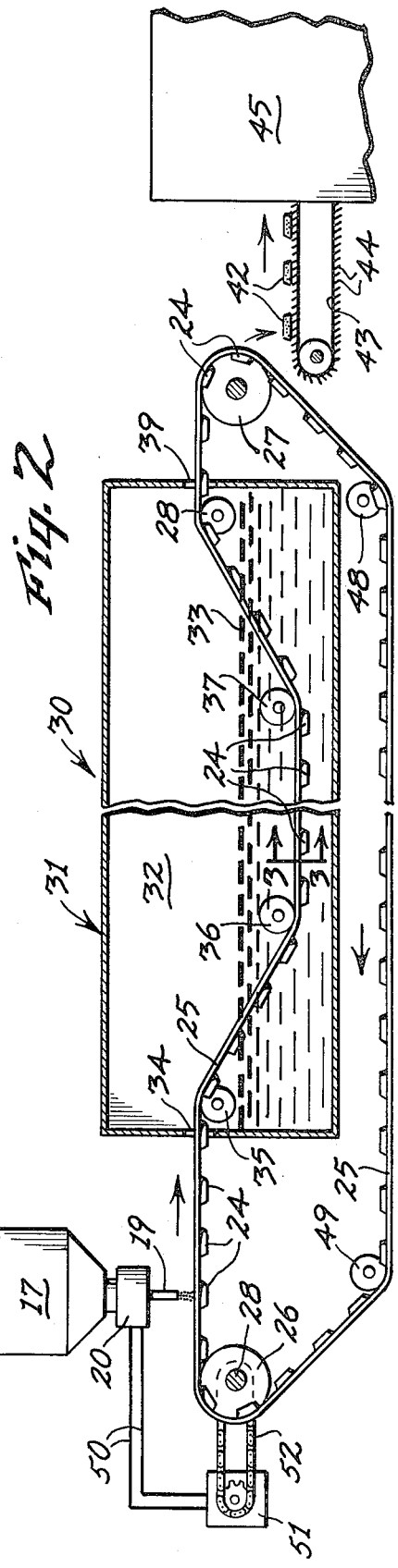

METHOD OF PREPARING MOLDED MEAT PRODUCTS

BACKGROUND OF THE INVENTION

This invention relates to a process of preparing food products, and more particularly to a process for preparing molded meat products.

In the processing of beef, the beef carcass is usually chilled and stored after it is slaughtered, or after it is slaughtered and hot-boned.

In the process of making pork sausage, the ground spice and blended meat products obtained from hot-boning are usually stuffed into a sausage casing and subsequently chilled or frozen for storage, transportation, or for further processing, such as cooking.

The process of hot-boning, cutting, sizing and trimming meat products and then encasing the meat products in wrappers or casing is disclosed to be old in the Vogt U.S. Pat. No. 2,298,779 issued Oct. 13, 1942.

The process of hot-boning meat, then cutting and freezing the meat prior to rigor-mortis, is disclosed in the Turner et al. U.S. Pat. No. 2,874,060 issued Feb. 17, 1959.

The steps of hot-boning, comminuting and blending meat products of all types including beef, pork and veal, and subsequently packaging the warm, fluent, comminuted meat products into air impermeable casings is disclosed to be old in the Vogel U.S. Pat. Nos. 3,124,462 issued Mar. 10, 1964; 3,677,775, issued July 18, 1972; 3,711,298 issued Jan. 16, 1973; and 3,713,847, issued Jan. 30, 1973.

SUMMARY OF THE INVENTION

It is therefore an object of this invention to provide a novel method of preparing molded meat products from a hot-boned animal carcass in the form of beef, pork or other meat, continuously, in a minimum of time and with a minimum of labor and material, and to produce a complete meat product of superior qualities.

More specifically the process includes the steps of immediately and sequentially hot-boning a freshly slaughtered animal carcass, comminuting the boned meat portions, optionally mixing spices with the meat portions and/or blending the meat portions, and subsequently transferring the warm, fluent, comminuted meat portions to a filler device. While in the warm and fluent state, the meat portions are dispensed in controlled portions to rigid cavities or receptacles in a moving conveyor belt at a temperature greater than 75° F. The conveyor transfers the receptacles containing the warm, fluent meat portions into a temperature processing station, which may include either a cooking apparatus or a chilling apparatus, depending upon the ultimate destination and use of the molded product. In the temperature processing station, the meat products are solidified or congealed into the shape defined by the cavity or receptacle. The molded meat products are then moved from the receptacles and stored, transported, or further processed.

If the meat portions within the receptacles are cooked, they are cooked long enough to become edible, or preferably until they attain an internal temperature of at least 140° F., before they are removed from their respective receptacles. After removal from the receptacles, the molded meat products may be drained and subsequently frozen for storage or transportation.

The meat products prepared in accordance with the above process are not only produced with a substantial economy in time, labor and materials, but are also produced with a minimum of shrinkage. Furthermore, because they are shaped in a fixed wall cavity or receptacle while still in their warm, fluent state, the final congealed, molded product has a more loose consistency, and is therefore more tender, than meat patties or other molded meat products prepared by other known processes.

Furthermore, when the meat portions are cooked in their cavities, there is a substantial saving in energy, because the meat portions within the receptacles have an initial temperature remaining from the body heat of the animal of approximately 75°–85° F., so that less energy is required to increase the temperature from this initial residual body heat to the ultimate heat required to cook the products. Such a saving in energy is in contrast to previous conventional cooking processes in which the meat portions are first chilled for storage and then introduced into the cooking apparatus at a much lower temperature.

BRIEF DESCRIPTION OF THE DRAWINGS

FIG. 1 is a top plan view of the apparatus for carrying out the process of this invention, in which some of the apparatus is disclosed in block diagram and some is shown schematically;

FIG. 2 is a side elevation of the schematically disclosed apparatus in FIG. 1, with the cooker apparatus disclosed in section; and FIG. 3 is an enlarged, fragmentary section taken along the line 3—3 of FIG. 2.

DESCRIPTION OF THE PREFERRED EMBODIMENTS

Referring now to the drawings in more detail, and initially to FIG. 1, the meat processed in accordance with this invention may be beef or pork, or any other warm-blooded edible animal. The freshly slaughtered animal is transferred to the boning table, where the carcass is hot-boned at the station 10. The meat portions or trimmings from the hot-boning step are then introduced into a grinder 11, such as a conventional commercial sausage grinder. The meat portions may be introduced in bulk, or carefully selected in order to obtain desired proportions of fat and lean meat or of selected cuts of the meat. When desired, such as for example when pork meat portions are processed, seasoning from the station or receptacle 12 may be introduced into the grinder 11. However, as illustrated by the dashed line station for the seasoning 12, such seasoning is optional. The meat portions are ground in the grinder 11 as soon as possible after the hot-boning at the station 10 is completed, so that the ground or comminuted meat portions are still in a warm, fluent condition and preferably between 90°–100° F. The comminuted meat portions are then transferred from the grinder 11 to a blender 13 where the meat portions are blended or mixed as desired to further distribute the fat and lean portions and the seasoning, if used. The blended meat portions which leave the blender 13 are still preferably at or above a temperature of approximately 90° F.

The blended meat portions are then conveyed in their warm, fluent condition through a conduit 14 by pump 15 and then through the discharge conduit 16 into a filler apparatus 17. The warm, fluent, comminuted, blended meat portions 18 are disclosed in FIG.

2 discharging from the conduit 16 into the filler hopper 17. The bottom portion of the filler apparatus 17 is provided with a plurality of transversely spaced dispensing or discharge spouts 19 which are controlled by an automatic valve mechanism 20 for periodically opening valves 21 to discharge controlled amounts or portions of the warm, fluent meat portions 18 through the discharge spouts 19.

Moving longitudinally beneath the discharge spouts 19 are a plurality of fixed wall cavities or receptacles 24. These receptacles 24, as disclosed in the drawings, are mounted in an endless conveyor belt 25 trained around a head pulley 26 and a tail pulley 27. The head pulley shaft 28 may be driven, by means not shown, in order to move the upper leg of the conveyor belt 25 forward, or toward the right in FIGS. 1 and 2, through a temperature processing station 30, specifically a cooking apparatus 31 disclosed in FIGS. 1 and 2. The particular cooking apparatus 31 disclosed in FIG. 2 includes a closed vessel or container 32 containing a predetermined level of cooking oil 33. The upper level of the leg of the conveyor belt 25 moves through the entrance slot 34 of the vessel 32 where it is trained over a guide pulley or roller 35, beneath guide rollers 36 and 37 and over trailing roller 28 where the belt 25 exits through the exit slot 39 of the vessel 32. The guide rollers 35, 36, 37 and 28 are so arranged that the belt conveyor 25 carries the filled receptacles 24 down into the hot cooking oil 33, and moves the receptacles 24 carrying the meat portions through the hot cooking oil 33 for a time determined by the rate of speed of the belt 25, the length of the vessel 32 and the spacing of the rollers 35–28. A typical temperature of the cooking oil 33 is approximately 350° F. The temperature, of course, may be varied, depending upon the amount of meat portions in each receptacle 24 and the length of time that the meat portion is maintained in the cooking oil 33. However, the internal temperature of the meat portion 40 in each receptacle 24 should be at least 140° F. before it is removed from the cooking oil 33.

As the conveyor belt 25 moves around the tail pulley or roller 27 at the right end of the cooking apparatus 31 of FIG. 2, each successive transverse row of receptacles 24 is inverted to dump the cooked molded meat products or patties 42, as disclosed in FIG. 2, upon a perforated conveyor belt 43. The slots or perforations 44 through the conveyor belt 43 permit the excess cooking oil and grease, or other juices, from the cooked meat products 42 to drain through the conveyor belt 43, as the meat products 42 are conveyed toward the right of FIGS. 1 and 2 into a chilling device or freeze tunnel 45. After the temperature of the molded cooked meat patties 42 are reduced to the desired degree, such as approximately 28° F., the chilled meat products are then transferred to a station 47 where they are packaged and/or stored or transported.

The lower level or leg of the conveyor belt 25 is trained about the lower guide rollers 48 and 49 for return to the head pulley or roller 26.

The discharge of the controlled meat portions from the discharge spouts 19 may be metered or timed by periodic opening and closing of the valves 21 by the valve control mechanism 20. The valve control mechanism 20 may constitute electromagnetically actuated valves 21 which are connected through electrical leads 50 to a timing device 51, synchronized through sprocket and chain transmission 52 with the rotation of the head pulley shaft 28.

Although the receptacle conveyor belt 25 is disclosed as continuously moving beneath the filler apparatus 17, nevertheless appropriate controls could be employed in which the conveyor belt is stopped periodically so that each discharge spout 19 will register with a corresponding receptacle 24 during the filling operation only.

As disclosed in FIG. 3, each receptacle 24 may be a structurally unitary cup having a top rim 54 adapted to be tightly seated within an annular recess 55 in the conveyor belt 25. The rim 54 is seated tightly enough within the annular recess 55 to prevent dislodgement upon inversion about the tail pulleys 27 when the meat portion 40 is discharged, but not so tight that the receptacle 24 cannot be forcibly removed for individual cleaning and replacement.

The receptacle 24 may also be provided with a bottom wall 56 having apertures 57 therethrough for penetration of the hot cooking oil 33' beneath the meat portion 40, and between the meat portion 40 and the inner surface of the wall of the receptacle 24, (FIG. 3). In this manner, the cooking oil 33' not only assists in directly cooking the bottom and sides of the meat portion 40, but also provides a film upon which the meat portion 40 floats. This oil film 33' eliminates, or at least minimizes, the sticking of the meat patty 40 to the inner surface of the cup or receptacle 24. Because of the hot oil film 33', the cooked meat products 42 readily separate from their corresponding receptacles 24 as they are discharged about the tail pulley 27.

Although a cooking apparatus 31 including a bath of cooking oil 33 is disclosed, nevertheless other types of cooking apparatus could be employed, such as an open-flame cooker or range, a gas or electric baking oven, radiation-type ovens, and various other types of cooking apparatus.

It is also within the scope of this invention to sustitute in the temperature processing station 30 for the cooking apparatus 31, a chilling device, similar to the freeze tunnel 45. In this modification of the invention, the meat portions 40 within the receptacles 24 will be congealed by cooling or freezing, instead of by cooking, to attain their ultimate shape corresponding to the shape of each cavity or receptacle 24. After these uncooked meat products are chilled, they will be transferred directly to the station 47 for packaging, storage or transportation. In this modification of the invention, since there is no hot layer of cooking oil 33' within each receptacle 24, separation of the meat portion 40 from the walls of the receptacle 24 may be achieved by the slight contraction of the meat portion 40, by virtue of the reduced temperature, or the interior surface of the receptacle 24 may be formed of an "anti-stick" material, such as "Teflon," or it may be lined or coated with an "anti-stick" coating material.

Conventional types of filler apparatus 17 may be employed, so long as they discharge uniform amounts, preferably by weight, of portion-controlled meat, such as 1 oz., into each cavity 24.

It will be understood that the removable receptacles 24 disclosed in FIG. 3 may be replaced by receptacles of varying capacities for different weights of controlled portions of meat 40.

The type of chilling device 45 is not critical, and can be the disclosed freeze tunnel in which refrigeration is effected by the use of nitrogen or carbon dioxide at low temperatures. However the chilling aparatus 45 could be a mechanically refrigerated chamber.

Although the critical time for harmful bacteria to work in meat from the time of slaughter is approximately 4 hours, nevertheless the time required for the above process, from the slaughter of the animal until it is introduced into the temperature processing station 30 in an ambient temperature of 65°–75° F., is less than 2 hours, and under normal circumstances could be carried out in the neighborhood of 1 hour. The cooking process, that is the length of time required for the meat portions 40 to move through the length of the oil cooking apparatus 31 would be in the range of 40 seconds to 1 minute, depending upon various parameters, such as the speed of the belt, the temperature of the cooking oil, and the size of the meat portions 40. The time required for the cooked meat patties 42 to pass through the chilling device 45 could also be in the neighborhood of 1 to 3 minutes.

Accordingly, it is seen that a process has been developed for preparing uniform portion-controlled cooked meat products, or even frozen uncooked meat products of uniform size and quality, ready for packaging, storage, transportation or consumption in a very short period of time with a minimum of equipment and labor, and with a maximum retention of quality within the meat product 42.

Of special importance in this process is the fact that the controlled portions of the meat products ready for the consumer are prepared without any stuffing of the meat portions into casing, wrappers or packages, or without any concern for the permeability of air into the meat product, or reliance upon the flexible casings and packaging material to shape the final meat product.

Furthermore, the receptacles employed for the shaping and congealing of the fluent, warm meat portions are used again and again, because the receptacles are not employed as the package receptacles for the finished meat products.

The process of making molded meat products in accordance with this invention eliminates a substantial amount of equipment, such as equipment required for stuffing the warm, fluent meat material into casings. The process also eliminates the space and equipment necessary for cooling the meat stuffed in casings overnight prior to cooking the next day, in which the meat must again be removed from the casings, as in the present process of commercially cooking sausage. Eliminated from this process is the casing material itself, the machine for slicing the casing into patties preparatory to cooking the patties, and the labor involved in operating all of this equipment as well as picking up the patties after they are sliced and placing them on the conveyor which leads to the cooking apparatus.

Of course, the contraction of the time in which the meat portions are processed, from the slaughtered carcass until the meat enters the cooking apparatus or the freezer, reduces the exposure period of the warm, fluent materials to the air borne bacteria in the ambient atmosphere.

What is claimed is:

1. A method of preparing a meat product comprising the steps of:

a. hot boning a freshly slaughtered animal carcass to obtain warm, fluent meat pieces, at a temperature range of approximately 90°–100° F.,
   b. comminuting said meat pieces while in said temperature range,
   c. transferring said warm, fluent, comminuted meat to a filler station, the temperature of said meat being greater than 80° F. at said filler station,
   d. relatively moving a plurality of open, rigid receptacles of fixed uniform volume through said filler station,
   e. dispensing said warm, fluent, comminuted meat at a temperature greater than 75° F. from said filler station in substantially uniform portions into each of said receptacles,
   f. relatively moving said receptacles containing said warm, fluent, meat portions through a temperature processing station,
   g. rapidly changing the temperature of said meat portions in said receptacles at said processing station to congeal said meat portions into meat products molded into the shape of said receptacles, and
   h. removing said molded meat products from said receptacles.

2. The method according to claim 1 in which said temperature processing station is a cooking apparatus and the step of rapidly changing the temperature of said meat portions comprises cooking said meat portions within said cooking apparatus.

3. The method according to claim 2 in which the step of relatively moving said receptacles through the temperature processing station comprises moving the receptacles at a uniform rate of speed through said cooking apparatus at a uniform temperature until said meat products are edible.

4. The method according to claim 3 in which said cooking meat products remain within said cooking apparatus until they have attained an internal temperature of at least 140° F.

5. The method according to claim 3 in which said removing step comprises inverting said receptacles after said receptacles have been moved through said cooking apparatus, to discharge said cooked meat products upon a drainage station to permit said cooked meat products to drain.

6. The method according to claim 5 further comprising the step of moving said cooked meat products from said drainage station to a freezing station, and freezing said cooked meat products at said freezing station.

7. The method according to claim 1 further comprising the step of blending said warm, fluent meat portions after the comminuting of said meat portions, but before the transferring of said meat portions to said filler station.

8. The method according to claim 1 in which said meat products comprise beef.

9. The method according to claim 1 in which said meat products comprise pork.

10. The method according to claim 1 in which said temperature processing station is a chilling apparatus and said step of rapidly changing the temperature of said meat portions comprises rapidly reducing the temperature of said meat portions in said chilling apparatus.

* * * * *